(12) United States Patent
Fresnet et al.

(10) Patent No.: US 8,156,735 B2
(45) Date of Patent: Apr. 17, 2012

(54) METHOD FOR CONTROLLING A FACILITY FOR TREATING EXHAUST GASES FROM AN INTERNAL COMBUSTION ENGINE

(75) Inventors: Francois Fresnet, Nanterre (FR); Nathalie Leiglon, Paris (FR)

(73) Assignee: Renault S.A.S., Boulogne Billancourt (FR)

(*) Notice: Subject to any disclaimer, the term of this patent is extended or adjusted under 35 U.S.C. 154(b) by 575 days.

(21) Appl. No.: 12/298,363

(22) PCT Filed: Mar. 9, 2007

(86) PCT No.: PCT/FR2007/050900
§ 371 (c)(1),
(2), (4) Date: Mar. 24, 2009

(87) PCT Pub. No.: WO2007/125228
PCT Pub. Date: Nov. 8, 2007

(65) Prior Publication Data
US 2009/0320455 A1 Dec. 31, 2009

(30) Foreign Application Priority Data
Apr. 25, 2006 (FR) ..................................... 06 03632

(51) Int. Cl.
*F01N 3/00* (2006.01)
(52) U.S. Cl. ................. 60/295; 60/286; 60/275; 60/297
(58) Field of Classification Search .................... 60/286, 60/275, 295, 297
See application file for complete search history.

(56) References Cited

U.S. PATENT DOCUMENTS

| | | | |
|---|---|---|---|
| 2002/0062641 A1 | 5/2002 | Shiino et al. | |
| 2004/0098977 A1 | 5/2004 | Kupe et al. | |
| 2004/0216451 A1 | 11/2004 | LaBarge et al. | |
| 2005/0103001 A1 | 5/2005 | Kupe et al. | |
| 2005/0138916 A1* | 6/2005 | Bonadies et al. | 60/275 |
| 2005/0274104 A1 | 12/2005 | Bromberg et al. | |
| 2006/0168950 A1* | 8/2006 | Taylor et al. | 60/295 |

FOREIGN PATENT DOCUMENTS

| | | |
|---|---|---|
| EP | 1 211 394 | 6/2002 |
| EP | 1 607 133 | 12/2005 |
| FR | 2 849 468 | 7/2004 |

OTHER PUBLICATIONS

Jones, M. R. et al., "Exhaust-Gas Reforming of Hydrocarbon Fuels", SAE Technical Paper Series, Society of Automotive Engineers, pp. 223-234 (1993).

* cited by examiner

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

A facility for treating exhaust gases from an internal combustion engine (1) comprises catalytic oxidation means (3), a particle filter (4) placed downstream from the catalytic oxidation means (3), a reformer (5) to produce reformate. The reformate is introduced with the exhaust gases upstream of the catalytic oxidation means in order to obtain a pre-set recommended temperature Tcons of the gases heated upstream of the particle filter (4), so as to regenerate the particle filter (4) by raising the temperature of the gases, a calculated reformate flow Qref_calc is determined as a function of the recommended temperature Tcons, a discrepancy coefficient is determined as a function of the difference between the recommended temperature Tcons and a measured temperature Tmes upstream of the particle filter, and the reformer (5) is controlled with a recommended reformate flow Qref_cons as a function of the discrepancy coefficient a and the calculated reformate flow Qref_calc.

8 Claims, 1 Drawing Sheet

METHOD FOR CONTROLLING A FACILITY FOR TREATING EXHAUST GASES FROM AN INTERNAL COMBUSTION ENGINE

BACKGROUND

The invention relates to a method for control of an exhaust-gas treatment installation of an internal combustion engine, especially of a motor-vehicle engine.

The heterogeneity of combustion processes in engines with lean mixture, especially in Diesel engines, has the effect of generating carbon particles, which cannot be burned efficiently in the engine. That is manifested, for example, by the discharge of black smoke at the outlet of the exhaust line. This phenomenon is a source of pollution that one is attempting to reduce.

The presence of a particulate filter in the exhaust line of the engine makes it possible to decrease considerably the amount of particles, dust and other forms of soot discharged into the atmosphere and to satisfy the anti-pollution standards.

Regeneration procedures make it possible periodically to burn the particles trapped in the filter and to avoid clogging thereof. The soot particles are substantially carbon-containing species, and their combustion consumes oxygen to form carbon dioxide.

Combustion of soot in the particulate filter is induced by raising the temperature of the exhaust gases within the particulate filter to a temperature on the order of 550 to 650° C., the temperature at which combustion of carbon particles retained in the filter is initiated.

Filter regeneration is controlled by a calculator, which determines whether regeneration must take place and, when it is in progress, whether it may continue.

To initiate and maintain regeneration, there is frequently used a method that consists in modifying the operating conditions of the engine to raise the temperature of the exhaust gases before they are passed into the particulate filter. These modifications often involve fuel injection, which may be delayed for at least one combustion chamber of the engine. Likewise, in certain cases, post-injection of fuel is effected during the final phase of the expansion stroke. This latter injection does not supply any additional mechanical power to the engine, but it raises the temperature of the exhaust gases.

These methods have the disadvantage of being very intrusive as regards the functioning of the engine and of significantly increasing the fuel consumption. In addition, because of a phenomenon known as dilution, they increase the fuel concentration in the lubricating oil.

Sometimes the exhaust-gas treatment installations also contain nitrogen oxides (NOx) traps, which capture the nitrogen oxides generated during combustion. During a desorption operation under reducing conditions, the nitrogen oxides are reduced to nitrogen and liberated.

Furthermore, the document US2005/0103001 A1 proposes, for an internal combustion engine, an exhaust-gas treatment installation provided with a first oxidation catalyst, followed in the direction of circulation of the exhaust gases by a nitrogen oxide trap and a particulate filter. The installation is additionally provided with a reformer, with which a reformate can be generated from the vehicle fuel. Upon command, the reformate is injected upstream from one of the aforesaid components. The reformate is rich in hydrogen (H2) and carbon monoxide (CO). When it is injected upstream from the oxidation catalyst, the reformate undergoes oxidation with the oxygen contained in the exhaust gases, generating heat. This heat is used to raise the temperature of the exhaust gases upstream from the particulate filter and to induce regeneration thereof. When the reformate is injected upstream from the nitrogen oxide trap, it is also oxidized by the oxygen of the exhaust gases, just as on an oxidation catalyst. In fact, in common with the oxidation catalyst, the nitrogen oxides trap is provided with metals capable of oxidizing hydrogen and carbon monoxide in the presence of oxygen.

If the amount of reformate injected is insufficient, the temperature attained upstream from the particulate filter will be insufficient to initiate and maintain regeneration.

If on the contrary it is excessive, the risk exists that the installation temperature will rise to a level destructive for the installation.

BRIEF SUMMARY

An objective of the invention is therefore to propose a control method making it possible to guarantee control of regeneration of the particulate filter without the risk of damaging the installation.

With this objective in view, the invention is applicable to an exhaust-gas treatment installation of an internal combustion engine, the installation comprising catalytic oxidation means, a particulate filter disposed downstream from the catalytic oxidation means, means for measuring a temperature $T_{mes}$ of the gases upstream from the particulate filter and a reformer for producing a reformate. The object of the invention is a control method, wherein the reformate is introduced with the exhaust gases upstream from the catalytic oxidation means to obtain a predetermined setpoint temperature $T_{set}$ of the heated gases upstream from the particulate filter, in such a way as to regenerate the particulate filter by raising the temperature of the gases, a calculated flow of reformate is determined according to the setpoint temperature $T_{set}$, a difference coefficient is determined according to the difference between the setpoint temperature $T_{set}$ and the measured temperature $T_{mes}$ upstream from the particulate filter, and the reformer is controlled with a setpoint flow of reformate according to the difference coefficient and the calculated flow of reformate. By means of a model of the oxidation of the reformate, it is possible to predict a temperature upstream from the particulate filter according to a flow of reformate and of exhaust gas. In this way the calculated flow of reformate can be determined immediately, as soon as the regeneration cycle of the particulate filter has been initiated. Furthermore, by adding closed-loop servo-control and by applying the setpoint flow, corrected according to the difference coefficient, the differences between the model and the real dynamics of the temperature upstream from the particulate filter are taken into account. The measurement differences are also corrected. Even if the model is simplified and does not take all the real parameters into account, it is possible to obtain a temperature upstream from the particulate filter close to the desired temperature necessary to achieve regeneration, without reaching levels that would be destructive.

In particular manner, the calculated flow is determined according to the change of enthalpy of the gases due to the input of energy from oxidation of the reformate. The temperature model is based only on the input of energy of the reformate to the exhaust gases. This model is simple to use, and it yields satisfactory results.

In this case, the calculated flow $Q_{ref\_calc}$ can be determined by the formula:

$$Q_{ref\_calc} = \frac{C_{exh}Q_{exh}(T_{set} - T_{exh})}{\Delta H_{H2}\eta_{H2} + \Delta H_{CO}\eta_{CO} - C_{ref}M_{ref}(T_{set} - T_{ref})}$$

in which:

$Q_{exh}$ is the mass flow of exhaust gases at the engine outlet;
$T_{exh}$ is the temperature of the exhaust gases;
$C_{exh}$ is the specific heat capacity of the exhaust gases;
$T_{ref}$ is the temperature of the reformate;
$C_{ref}$ is the specific heat capacity of the reformate;
$\Delta H_{H2}$ is the enthalpy change during oxidation of one mole of hydrogen;
$\Delta H_{CO}$ is the enthalpy change during oxidation of one mole of carbon monoxide;
$T_{set}$ is the setpoint temperature upstream from the particulate filter;
$\eta_{CO}$ is the molar fraction of carbon monoxide in the reformate;
$\eta_{H2}$ is the molar fraction of hydrogen in the reformate;
$M_{ref}$ is the molar mass of the reformate.

By way of example, the difference coefficient is determined by the formula:

$$\alpha = \frac{T_{mes} - T_{up}}{T_{set} - T_{up}}$$

in which $T_{up}$ is the temperature of the gaseous mixture upstream from the catalytic oxidation means.

In particular manner, the corrected flow is the ratio of the setpoint flow to the difference coefficient.

If the measured temperature is equal to the setpoint temperature, the difference coefficient is equal to 1, and so no correction is applied to the setpoint flow. If the measured temperature is lower than the setpoint temperature, the difference coefficient is smaller than 1, and so the setpoint flow is greater than the calculated flow.

According to an improvement of the method, if the measured temperature is very different from the setpoint temperature, the setpoint flow is the calculated flow. This limits potential excursions of the setpoint value that could generate oscillation phenomena or large ranges of variation of temperature.

For example, it is considered that the measured temperature is very different from the setpoint temperature if the difference coefficient is smaller than 0.7.

According to another improvement, the corrected flow is based on a value of predetermined maximum flow. This avoids giving the reformer a setpoint flow that it could not maintain.

According to a particular embodiment, the catalytic oxidation means are a nitrogen oxides trap. The nitrogen oxides trap contains metals having a catalytic function capable of causing the desired reactions of oxidation of the reformate. The energy exchanges during desorption in the nitrogen oxides trap are negligible and do not impair application of the method according to the invention.

BRIEF DESCRIPTION OF THE DRAWINGS

The method will be better understood and other particular features and advantages will become apparent on reading the description hereinafter, the description referring to the attached drawings, wherein.

DETAILED DESCRIPTION

Figure 1:
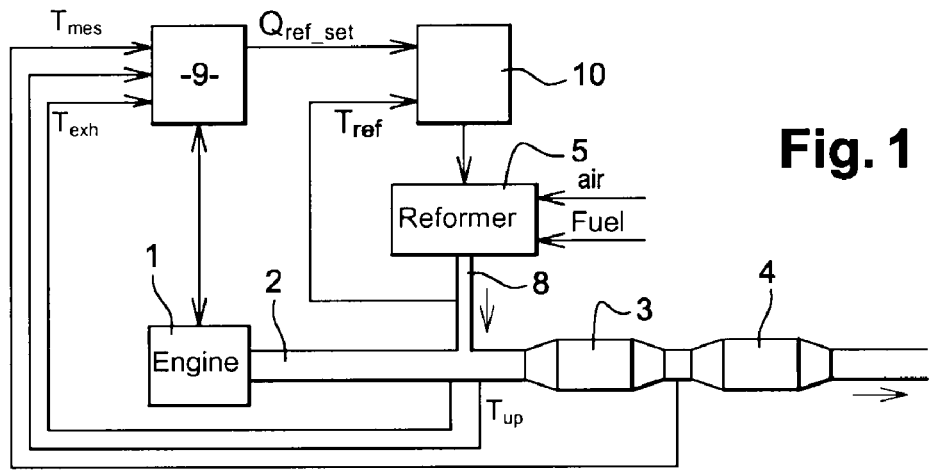
FIG. 1 is a diagram of an installation implementing the method according to the invention.

An exhaust-gas treatment installation of a motor vehicle engine is shown schematically in FIG. 1. The installation is provided with an internal combustion engine 1, an exhaust manifold 2 that channels the exhaust gas to a nitrogen oxides trap 3, and a particulate filter 4, which receives the gases emerging from nitrogen oxides trap 3. The installation is also provided with a reformer 5, which produces reformate from the air and the vehicle fuel, such as diesel oil. A reformate conduit 8 channels the reformate to exhaust manifold 2 upstream from nitrogen oxides trap 3. Reformer 5 may be of any known type, such as a steam reformer, a partial-oxidation reformer or an auto-thermal reformer.

Reformer 5 is provided with a reformer calculator 10, which controls reformer 5 so that it generates the desired flow of reformate having the desired richness. The installation is also provided with an engine calculator 9, which controls engine 1, and especially the injection of fuel. Engine calculator 9 receives information about the state or functioning of engine 1 from transducers. In addition, it receives temperature information from temperature transducers such as thermocouples: an exhaust-gas temperature Texh measured in exhaust manifold 2, a mixture temperature Tup upstream from nitrogen oxides trap 3 and downstream from the connection of reformate conduit 8 to exhaust manifold 2, and a temperature Tmes of the heated gases upstream from the particulate filter. Furthermore, the reformer calculator receives a reformate temperature Tref, measured in reformate conduit 8.

When engine 1 is running, it generates exhaust gases, which are evacuated via exhaust manifold 2 then via nitrogen oxides trap 3 and finally via particulate filter 4. When reformer calculator 10 determines that it is necessary to regenerate particulate filter 4, it commands reformer 5 to generate reformate to be injected into the exhaust gases. The reformate passes through nitrogen oxides trap 3 and undergoes oxidation with the oxygen contained in the exhaust gases. The oxidation is caused by the presence of catalysts in nitrogen oxides trap 3, in a manner known in itself. The oxidation causes liberation of an amount of energy that acts to raise the temperature of the exhaust gases upstream from the particulate filter. The gases heated in this way pass into particulate filter 4 and, by virtue of their temperature, cause regeneration of the particle filter by combustion of the soot trapped in the filter. A setpoint temperature Tset, at which regeneration can be achieved without damaging the installation, is predetermined for the heated gases.

Figure 2:
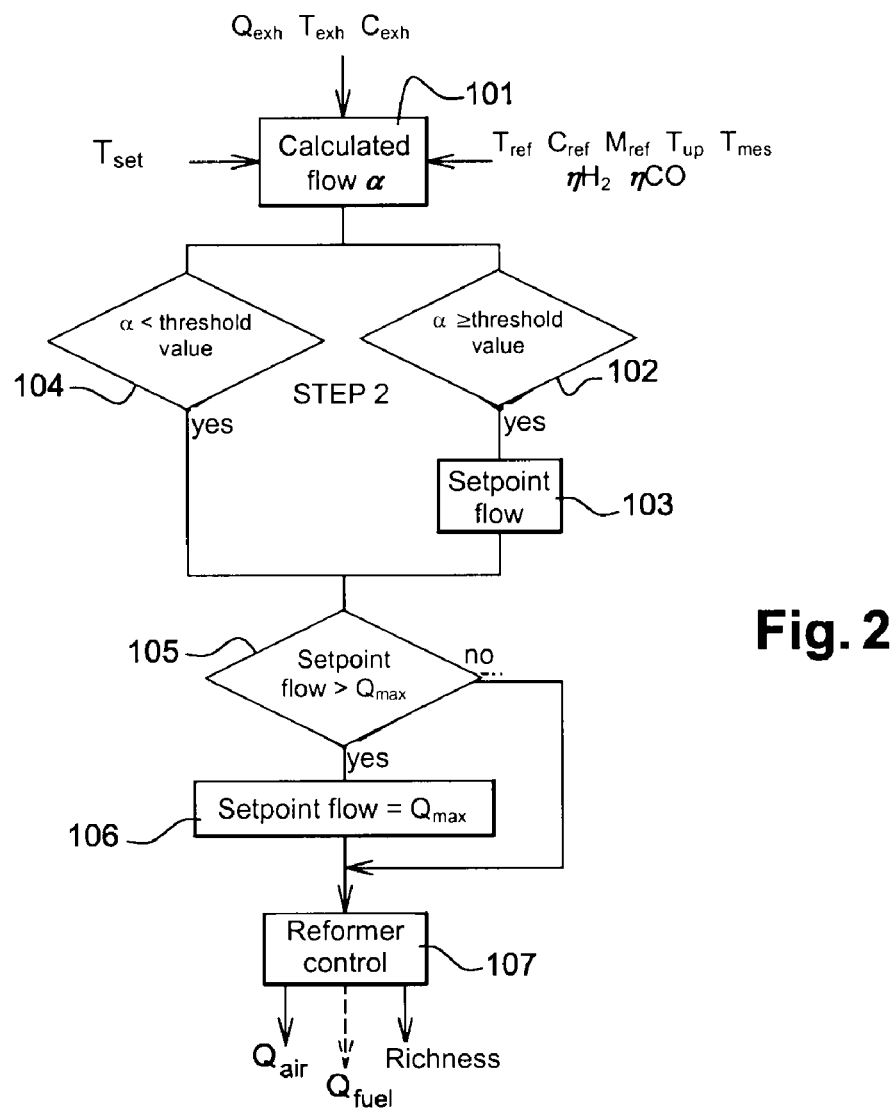
FIG. 2 is a flow diagram representing the method according to the invention.

Engine calculator 9 transmits to reformer calculator 10 all the information necessary for its operation, especially the measured temperatures such as described hereinabove and the estimated or measured exhaust-gas flow $Q_{exh}$. When regeneration of particulate filter 4 is commanded, the method according to FIG. 2 is implemented in order to determine the reformate flow to be generated. In step 101, there is determined a calculated flow according to the formula:

$$Q_{ref\_calc} = \frac{C_{exh}Q_{exh}(T_{set} - T_{exh})}{\Delta H_{H2}\eta_{H2} + \Delta H_{CO}\eta_{CO} - C_{ref}M_{ref}(T_{set} - T_{ref})}$$

in which:

$Q_{ref\_calc}$ is the calculated flow of reformate, in kg/s;
$Q_{exh}$ is the mass flow of exhaust gases at the engine outlet, in kg/s;
$T_{exh}$ is the temperature of the exhaust gases, in K;
$C_{exh}$ is the specific heat capacity of the exhaust gases, in J/kg/K;
$T_{ref}$ is the temperature of the reformate, in K;
$C_{ref}$ is the specific heat capacity of the reformate, in J/kg/K;
$\Delta H_{H2}$ is the enthalpy change during oxidation of one mole of hydrogen, in J/mole;
$\Delta H_{CO}$ is the enthalpy change during oxidation of one mole of carbon monoxide, in J/mole;
$T_{set}$ is the setpoint temperature upstream from the particulate filter, in K;
$\eta_{CO}$ is the molar fraction of carbon monoxide in the reformate;
$\eta_{H2}$ is the molar fraction of hydrogen in the reformate;
$M_{ref}$ is the molar mass of the reformate, in kg/mol.

These last three variables $\eta_{CO}$, $\eta_{H2}$, $M_{ref}$ can be determined by reformer calculator 10 by consulting stored correspondence tables and using as input the operating point of reformer 5 such as defined by the richness of the air/fuel mixture to be reformed and the reformate flow. The same is true for the heat capacities $C_{exh}$, $C_{ref}$ of the exhaust gases and reformate.

There is also calculated the difference coefficient:

$$\alpha = \frac{T_{mes} - T_{up}}{T_{set} - T_{up}}$$

Thereafter, in step 102, it is determined whether the difference coefficient is larger than a predetermined threshold, such as 0.7. In this case, there is determined, in step 103, a setpoint flow according to the formula:

$$Q_{ref\_set} = \frac{Q_{ref\_calc}}{\alpha}$$

If, as determined in step 104, the difference coefficient is smaller than the predetermined threshold value, step 105 is undertaken directly. This step also is undertaken after step 103. During step 105, it is determined whether the setpoint flow exceeds a maximal flow Qmax predetermined according to the capacities of the installation. If such is the case, the calculated flow is replaced in step 106 by the maximal flow Qmax, so as to limit the setpoint value.

In step 107, the setpoint flow is subdivided into a richness command and an air-flow command for reformer 5. If applicable, one of the foregoing commands may be combined with a fuel-flow command, depending on the type of command accepted by reformer 5.

These steps 101 to 107 are repeated cyclically as long as regeneration is necessary.

The invention is not limited to the embodiment described above merely by way of example. The nitrogen oxides trap may be replaced by other means for catalytic oxidation of the reformate, such as an oxidation catalyst. The setpoint temperature Tset may evolve in the course of regeneration.

The invention claimed is:

1. A method for control of an exhaust-gas treatment installation of an internal combustion engine, wherein the installation is provided with catalytic oxidation means, a particulate filter disposed downstream from the catalytic oxidation means, means for measuring a temperature $T_{mes}$ of heated gases upstream from the particulate filter and a reformer for producing a reformate, the method comprising:

determining a calculated flow $Q_{ref\_calc}$ of reformate according to a predetermined setpoint temperature $T_{set}$ of the heated gases upstream from the particulate filter, determining a difference coefficient α according to a difference between the setpoint temperature $T_{set}$ and the measured temperature $T_{mes}$ upstream from the particulate filter, comparing the difference coefficient α to a predetermined threshold value, when the difference coefficient α is greater than or equal to the predetermined threshold value, dividing the calculated flow $Q_{ref\_calc}$ of reformate by the difference coefficient α to calculate a setpoint flow rate $Q_{ref\_set}$ of reformate to be injected into the exhaust gases, when the difference coefficient α is less than the predetermined threshold value, setting the setpoint flow rate $Q_{ref\_set}$ of reformate to be injected into the exhaust gases equal to the calculated flow $Q_{ref\_calc}$ of reformate, and controlling the reformer with the setpoint flow $Q_{ref\_set}$ of reformate to inject the reformate into the exhaust gases upstream from the catalytic oxidation means to obtain the predetermined setpoint temperature $T_{set}$ of the heated gases upstream from the particulate filter to regenerate the particulate filter by raising the temperature of the gases.

2. The method according to claim 1, wherein the calculated flow $Q_{ref\_calc}$ is determined according to a change of enthalpy of the gases due to an input of energy from oxidation of the reformate.

3. The method according to claim 1, wherein the calculated flow $Q_{ref\_calc}$ is determined by the formula:

$$Q_{ref\_calc} = \frac{C_{exh} Q_{exh}(T_{set} - T_{exh})}{\Delta H_{H2}\eta_{H2} + \Delta H_{CO}\eta_{CO} - C_{ref}M_{ref}(T_{set} - T_{ref})}$$

in which:
$Q_{exh}$ is a mass flow of exhaust gases at an engine outlet;
$T_{exh}$ is a temperature of the exhaust gases;
$C_{exh}$ is a specific heat capacity of the exhaust gases;
$T_{ref}$ is a temperature of the reformate;
$C_{ref}$ is a specific heat capacity of the reformate;
$\Delta H_{H2}$ is an enthalpy change during oxidation of one mole of hydrogen;
$\Delta H_{CO}$ is an enthalpy change during oxidation of one mole of carbon monoxide;
$T_{set}$ is the setpoint temperature upstream from the particulate filter;
$\eta_{CO}$ is a molar fraction of carbon monoxide in the reformate;
$\eta_{H2}$ is a molar fraction of hydrogen in the reformate;
$M_{ref}$ is a molar mass of the reformate.

4. The method according to claim 1, wherein the difference coefficient α is determined by the formula:

$$\alpha = \frac{T_{mes} - T_{up}}{T_{set} - T_{up}}$$

in which $T_{up}$ is a temperature of the gaseous mixture upstream from the catalytic oxidation means.

5. The method according to claim 1, wherein, if the difference coefficient α is smaller than 0.7, the setpoint flow $Q_{ref\_set}$ is the calculated flow $Q_{ref\_calc}$.

6. The method according to claim 1, wherein the setpoint flow $Q_{ref\_set}$ is based on a value of predetermined maximum flow $Q_{max}$.

7. The method according to claim 1, wherein the catalytic oxidation means are a nitrogen oxides trap.

8. The method according to claim 1, wherein the controlling the reformer includes comparing the setpoint flow $Q_{ref\_set}$ of reformate with a predetermined maximal flow $Q_{max}$ of reformate and, when the setpoint flow $Q_{ref\_set}$ of reformate is greater than the predetermined maximal flow $Q_{max}$ of reformate, replacing the setpoint flow $Q_{ref\_set}$ of reformate with the predetermined maximal flow $Q_{max}$ of reformate to limit an amount of the reformate injected into the exhaust gases.

* * * * *